US012208505B2

(12) United States Patent
Su

(10) Patent No.: US 12,208,505 B2
(45) Date of Patent: Jan. 28, 2025

(54) TOOL IDENTIFICATION AND ORGANIZATION DEVICE

(71) Applicant: HONG ANN TOOL INDUSTRIES CO., LTD., Taichung (TW)

(72) Inventor: Cheng-Wei Su, Taichung (TW)

(73) Assignee: HONG ANN TOOL INDUSTRIES CO., LTD., Taichung (TW)

( * ) Notice: Subject to any disclaimer, the term of this patent is extended or adjusted under 35 U.S.C. 154(b) by 70 days.

(21) Appl. No.: 18/173,289

(22) Filed: Feb. 23, 2023

(65) Prior Publication Data

US 2023/0330831 A1 Oct. 19, 2023

(30) Foreign Application Priority Data

Apr. 13, 2022 (TW) ................................. 111114087

(51) Int. Cl.
*B25H 3/00* (2006.01)
*G09F 23/00* (2006.01)

(52) U.S. Cl.
CPC ............. *B25H 3/003* (2013.01); *G09F 23/00* (2013.01)

(58) Field of Classification Search
CPC .......... B25H 3/003; B25H 3/00; B25H 3/006; B25H 3/06
USPC ................... 206/377, 376, 349; 211/70.6, 69
See application file for complete search history.

(56) References Cited

U.S. PATENT DOCUMENTS 2,833,419 A * 5/1958 Trumpy .................. B25B 13/56 248/316.1
3,236,366 A * 2/1966 Broda ................... B25H 3/003 D15/139
4,880,122 A * 11/1989 Martindell ............. B25H 3/003 206/374
4,982,627 A * 1/1991 Johnson ................ B23B 31/005 81/177.1
5,079,978 A * 1/1992 Kupfer .................... B25B 13/56 81/DIG. 5
5,730,303 A * 3/1998 Chow ...................... B25H 3/04 206/372
5,829,596 A * 11/1998 Budert ................... B25H 3/003 206/349
5,941,386 A * 8/1999 Hu ........................... B25H 3/04 211/70.6
5,988,408 A * 11/1999 Evans ...................... B25H 3/04 211/60.1
6,082,227 A * 7/2000 Vogel ...................... B25B 13/56 81/DIG. 5

(Continued)

FOREIGN PATENT DOCUMENTS

TW M574098 U 2/2019

*Primary Examiner* — Steven A. Reynolds
*Assistant Examiner* — Prince Pal
(74) *Attorney, Agent, or Firm* — MUNCY, GEISSLER, OLDS & LOWE, P.C.

(57) ABSTRACT

An tool identification and organization device includes a tool rack and a first tool. The tool rack is provided with a insertion portion and a front panel space from the insertion portion. The front panel is provided with a first identification hole penetrating therethrough. The first tool is configured to insert into the insertion portion in a height direction. The first tool is provided with a first color marking arranged on an outer periphery thereof and configured to align with the first identification hole to cause the first color marking being visible passing through the front panel via the first identification hole.

2 Claims, 6 Drawing Sheets

(56) References Cited

U.S. PATENT DOCUMENTS

| | | | | |
|---|---|---|---|---|
| 6,202,862 | B1 * | 3/2001 | Acquaviva | B43K 21/003 211/69.5 |
| 6,237,451 | B1 * | 5/2001 | Wei | B25H 3/003 81/177.4 |
| 6,360,892 | B1 * | 3/2002 | Chen | B25H 3/04 211/70.6 |
| 6,571,966 | B1 * | 6/2003 | Hsiao | A47F 7/0028 206/379 |
| 6,637,606 | B1 * | 10/2003 | Chen | B25H 3/04 206/372 |
| 6,679,391 | B1 * | 1/2004 | Huang | B25H 3/04 206/372 |
| 6,761,093 | B2 * | 7/2004 | Chang | B25B 13/06 81/DIG. 5 |
| 6,832,685 | B2 * | 12/2004 | Chang | B25H 3/003 206/759 |
| 7,028,588 | B2 * | 4/2006 | Shih | B25B 13/56 81/DIG. 5 |
| D613,946 | S * | 4/2010 | Su | D3/313 |
| 7,895,724 | B1 * | 3/2011 | Dugan | B25B 13/56 29/458 |
| 7,938,261 | B1 * | 5/2011 | Lee | B65D 73/0014 206/349 |
| 8,020,274 | B2 * | 9/2011 | Lin | B25B 13/06 29/458 |
| 8,069,997 | B2 * | 12/2011 | Cheng | B25H 3/04 206/349 |
| 8,083,059 | B1 * | 12/2011 | Wessel, IV | B25H 3/003 206/378 |
| 8,276,767 | B2 * | 10/2012 | Su | B25H 3/003 211/70.6 |
| 8,960,055 | B2 * | 2/2015 | Lin | B41M 5/00 81/119 |
| 9,919,415 | B1 * | 3/2018 | Su | B25H 3/003 |
| 10,252,411 | B2 * | 4/2019 | Su | F16B 2/22 |
| 10,675,750 | B1 * | 6/2020 | Winnard | G09F 3/02 |
| 10,967,498 | B2 * | 4/2021 | Lee | G09F 7/165 |
| D951,742 | S * | 5/2022 | Su | D8/71 |
| 2002/0070185 | A1 * | 6/2002 | Chen | B25H 3/04 211/70.6 |
| 2003/0080076 | A1 * | 5/2003 | Hu | A47F 7/0028 211/70.6 |
| 2003/0221954 | A1 * | 12/2003 | Hsien | B25B 13/56 204/232 |
| 2004/0000497 | A1 * | 1/2004 | Huang | B25H 3/04 206/376 |
| 2004/0089620 | A1 * | 5/2004 | Chen | B25H 3/04 211/70.6 |
| 2004/0094444 | A1 * | 5/2004 | Chen | B25H 3/04 211/70.6 |
| 2004/0200749 | A1 * | 10/2004 | Wang | B25H 3/003 206/349 |
| 2004/0216566 | A1 * | 11/2004 | Shih | B25B 13/56 81/119 |
| 2005/0211587 | A1 * | 9/2005 | Chen | B25H 3/003 206/349 |
| 2005/0241974 | A1 * | 11/2005 | Chen | B25H 3/003 206/349 |
| 2006/0186007 | A1 * | 8/2006 | Dost | B25H 3/003 206/379 |
| 2006/0278548 | A1 * | 12/2006 | Pangerc | B25H 3/003 206/349 |
| 2007/0007156 | A1 * | 1/2007 | Wu | B65D 73/0064 206/349 |
| 2008/0047400 | A1 * | 2/2008 | Hu | B25B 13/04 81/177.1 |
| 2008/0210593 | A1 * | 9/2008 | Cornwell | B25H 3/003 206/234 |
| 2009/0050501 | A1 * | 2/2009 | Serpico | B25H 3/003 206/379 |
| 2010/0018360 | A1 * | 1/2010 | Shyu | B25B 13/06 81/180.1 |
| 2010/0095813 | A1 * | 4/2010 | Hsieh | B25B 13/56 81/468 |
| 2011/0030196 | A1 * | 2/2011 | Hsieh | B25B 13/06 29/527.4 |
| 2011/0226713 | A1 * | 9/2011 | Su | B25H 3/003 211/70.6 |
| 2014/0196581 | A1 * | 7/2014 | Su | B25B 13/06 81/438 |
| 2015/0001113 | A1 * | 1/2015 | Hsiao | A45F 5/021 206/377 |
| 2016/0016712 | A1 * | 1/2016 | Su | B25H 3/04 206/349 |
| 2016/0052125 | A1 * | 2/2016 | Steele | B65D 25/205 206/349 |
| 2016/0129581 | A1 * | 5/2016 | Lee | B25B 13/04 81/489 |
| 2016/0167218 | A1 * | 6/2016 | Chou | B25B 13/56 206/377 |
| 2016/0236342 | A1 * | 8/2016 | Evatt | B25H 3/003 |
| 2018/0161972 | A1 * | 6/2018 | Hsiao | B25B 15/008 |
| 2018/0200877 | A1 * | 7/2018 | Su | B25H 3/04 |
| 2021/0008693 | A1 * | 1/2021 | Chang | B25B 23/0035 |
| 2021/0339365 | A1 * | 11/2021 | Chang | B25B 23/16 |
| 2023/0150109 | A1 * | 5/2023 | Chiang | B25H 3/006 206/375 |
| 2023/0330831 | A1 * | 10/2023 | Su | B25H 3/04 |
| 2024/0165772 | A1 * | 5/2024 | Chen | B25B 13/08 |

* cited by examiner

TOOL IDENTIFICATION AND ORGANIZATION DEVICE

BACKGROUND OF THE INVENTION

The present invention relates to a tool identification and organization device and, more particularly, to a device for identifying and organizing tools such as drive bits.

Taiwan Utility Model Patent No. TWM574098 discloses an identification structure, which is disposed between a first end and a second end of a tool bit. The surface of the identification structure is composed of a first annular surface, a second annular surface and a third annular surface. The first annular surface and the third annular surface are at two opposite sides of the second annular surface. The width of the first annular surface is substantially equal to the width of the third annular surface, and is narrower than the width of the second annular surface, such that the area of the second annular surface is larger than the area of the first annular surface or the third annular surface.

The identification structure is to allow users to quickly identify the specifications and sizes by utilizing the differences in the colors of the tool bits. However, when the tool bits are stored, in order to expose the identification structure, only the method that does not cover the identification structure can be used, resulting in a to poor fixing effect, and the tool bits are easy to fall off.

Thus, a need exists for a tool identification and organization device to mitigate and/or obviate the above disadvantages.

SUMMARY OF THE INVENTION

An objective of the present invention is to provide a tool identification and organization device that includes a tool rack and a first tool. The tool rack is provided with a insertion portion and a front panel space from the insertion portion. The front panel is provided with a first identification hole penetrating therethrough. The first tool is configured to insert into the insertion portion in a height direction. The first tool is provided with a first color marking arranged on an outer periphery thereof and configured to align with the first identification hole to cause the first color marking being visible passing through the front panel via the first identification hole. Thus, the tool organized in the tool rack can be indicated the size or type by the visible color marking.

In an embodiment, the front panel is further provided with at least one second identification hole penetrating therethrough. The tool identification and organization device further includes at least one second tool configured to insert into the insertion portion in the height direction to dispose adjacent to the first tool. The at least one second tool is provided with a second color marking arranged on an outer periphery thereof and configured to align with the at least one second identification hole to cause the second color marking being visible passing through the front panel via the at least one second identification hole. The second color marking has a color different than that of the first color marking.

In an embodiment, the front panel is further provided with at least one third identification hole and at least one fourth identification hole respectively penetrating therethrough. The tool identification and organization device further includes at least one third tool and at least one fourth tool. The at least one third tool is configured to insert into the insertion portion in the height direction to dispose adjacent to the at least one second tool. The at least one third tool is provided with a third color marking arranged on an outer periphery thereof and configured to align with the at least one third identification hole to cause the third color marking being visible passing through the front panel via the at least one third identification hole. The third color marking has a color different than that of the first color marking and the second color marking. The at least one fourth tool is configured to insert into the insertion portion in the height direction to dispose adjacent to the at least one third tool. The at least one fourth tool is provided with a fourth color marking arranged on an outer periphery thereof and configured to align with the at least one fourth identification hole to cause the fourth color marking being visible passing through the front panel via the at least one fourth identification hole. The fourth color marking has a color different than that of the first color marking, the second color marking and the third color marking.

In an embodiment, the front panel has an outer surface disposed opposite to the insertion portion and provided with a first outer marking located adjacent to the first identification hole, at least one second outer marking located adjacent to the at least one second identification hole, at least one third outer marking located adjacent to the at least one third identification hole, and at least one fourth outer marking located adjacent to the at least one fourth identification hole. The first outer marking, the at least one second outer marking, the at least one third outer marking and the at least one fourth outer marking respectively have different characters.

In an embodiment, the first tool is further provided with a first character marking arranged on an outer periphery thereof and having a same character as the first outer marking. The at least one second tool is further provided with a second character marking arranged on an outer periphery thereof and having a same character as the second outer marking. The at least one third tool is further provided with a third character marking arranged on an outer periphery thereof and having a same character as the third outer marking. The at least one fourth tool is further provided with a fourth character marking arranged on an outer periphery thereof and having a same character as the fourth outer marking.

In an embodiment, the first color marking surrounds the first tool in a circumference direction of the first tool. The first character marking is formed on a side surface of the outer periphery of the first tool. The second color marking surrounds the second tool in a circumference direction of the second tool. The second character marking is formed on a side surface of the outer periphery of the second tool. The third color marking surrounds the third tool in a circumference direction of the third tool. The third character marking is formed on a side surface of the outer periphery of the third tool. The fourth color marking surrounds the fourth tool in a circumference direction of the fourth tool. The fourth character marking is formed on a side surface of the outer periphery of the fourth tool.

In an embodiment, the number of the at least one second tool, the number of the at least one second identification hole and the number of the at least one second outer marking are plural and have the same number. The number of the at least one third tool, the number of the at least one third identification hole and the number of the at least one third outer marking are plural and have the same number. The number of the at least one fourth tool, the number of the at least one fourth identification hole and the number of the at least one fourth outer marking are plural and have the same number.

In an embodiment, the tool rack is further provided with a rear panel spaced from the front panel. The insertion portion is arranged between the front panel and the rear panel. A side of the rear panel adjacent to the insertion portion is provided with a pair of first clamping arms configured to clamp the first tool, a plurality of pair of second clamping arms configured to clamp the plurality of second tools, a plurality of pair of third clamping arms configured to clamp the plurality of third tools, and a plurality of pair of fourth clamping arms configured to clamp the plurality of fourth tools.

In an embodiment, the rear panel is provided with a rear lower edge and a rear upper edge opposite to the rear lower edge and defines a first height from the rear lower edge to the rear upper edge in the height direction. The front panel is further provide a front lower edge and defines a second height from the rear lower edge to the front lower edge in the height direction. The second height is less than the first height.

The present invention will become clearer in light of the following detailed description of illustrative embodiments of this invention described in connection with the drawings.

DETAILED DESCRIPTION OF THE INVENTION

Figure 1:
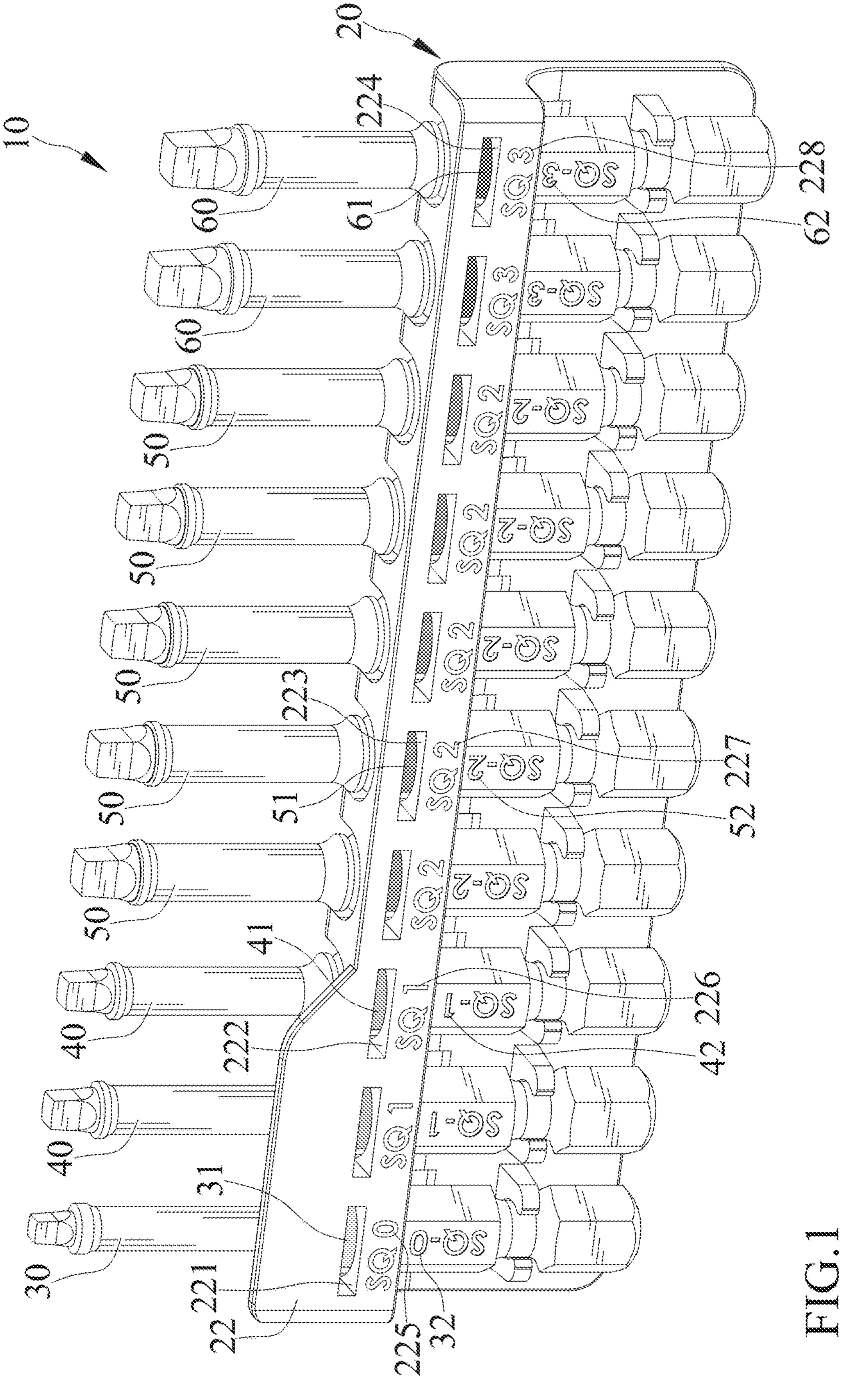
FIG. 1 is a perspective view of a tool identification and organization device of an embodiment according to the present invention.
Figure 2:
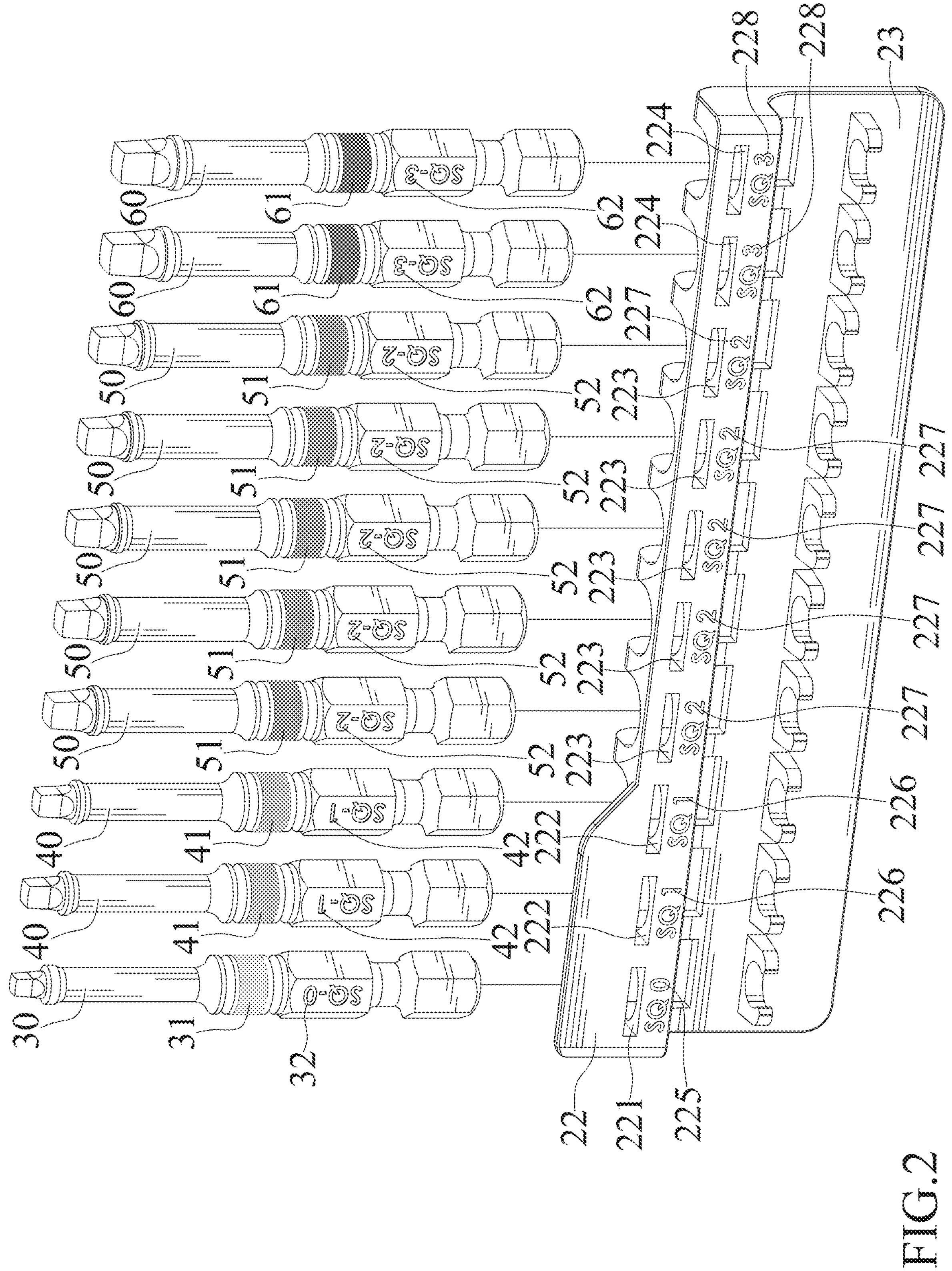
FIG. 2 is an exploded perspective view of the tool identification and organization device of FIG. 1.
Figure 3:
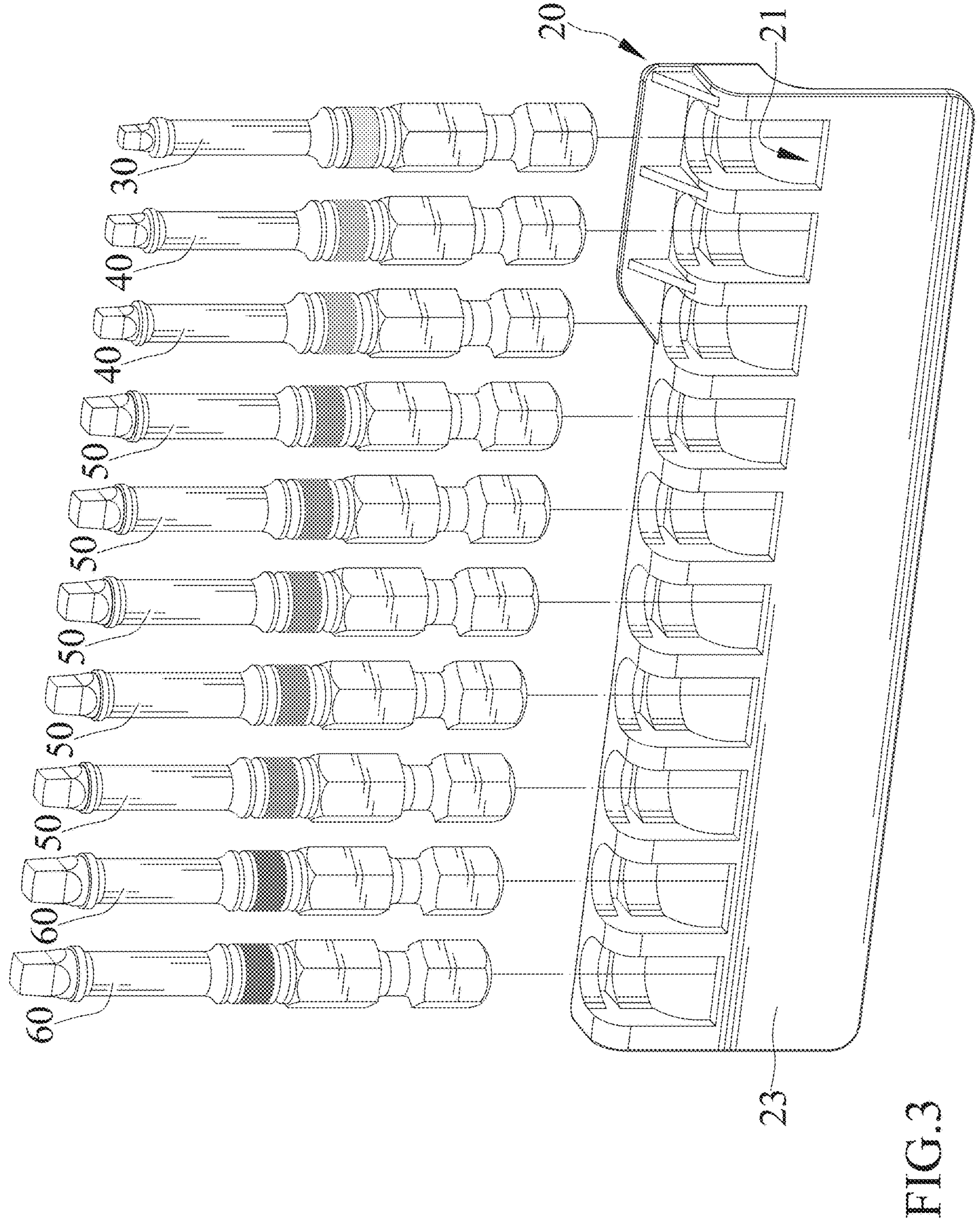
FIG. 3 is another exploded perspective view of the tool identification and organization device of FIG. 1 taken from another view angle.
Figure 4:
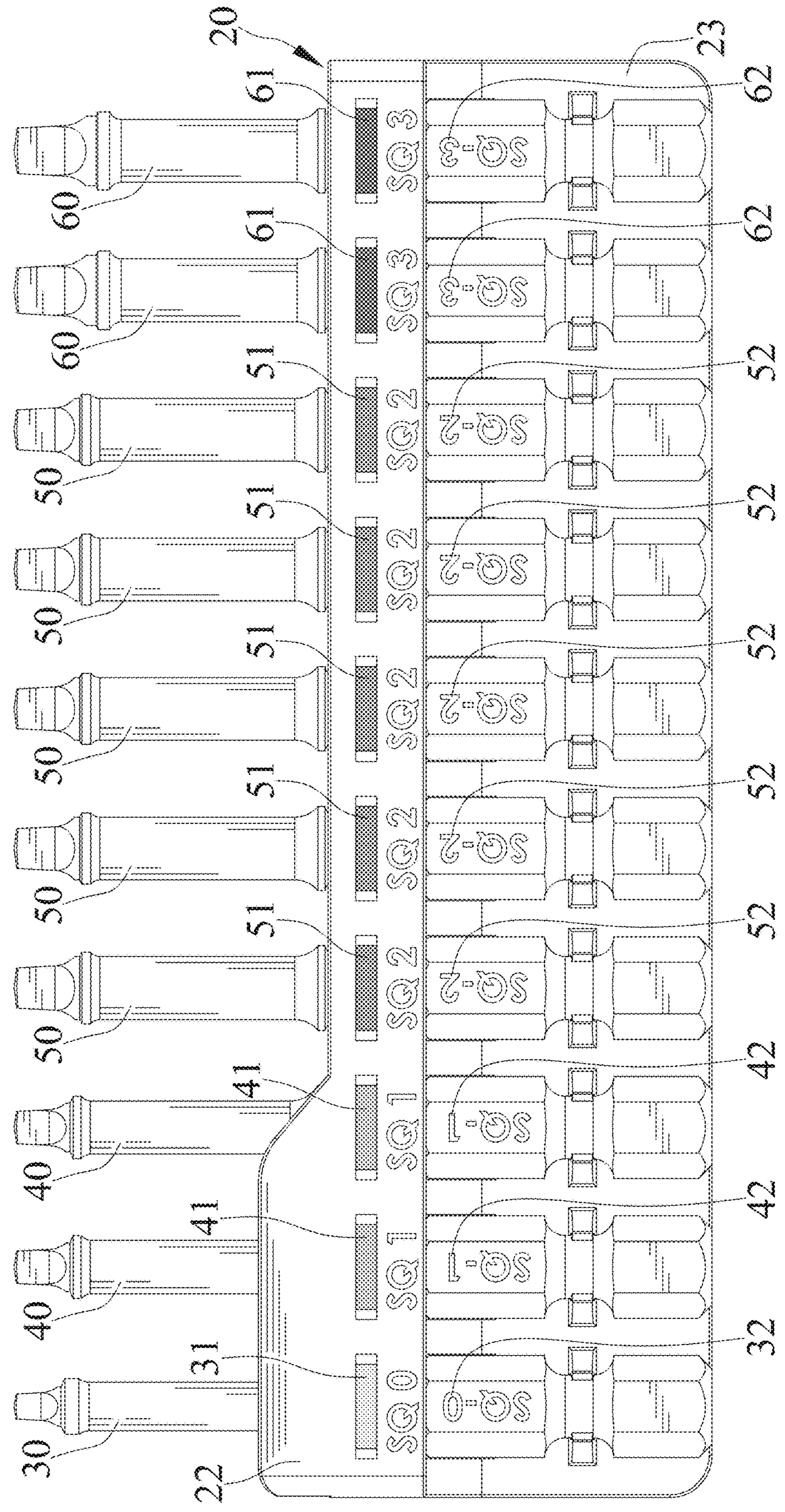
FIG. 4 is a front view of the tool identification and organization device of FIG. 1.
Figure 5:
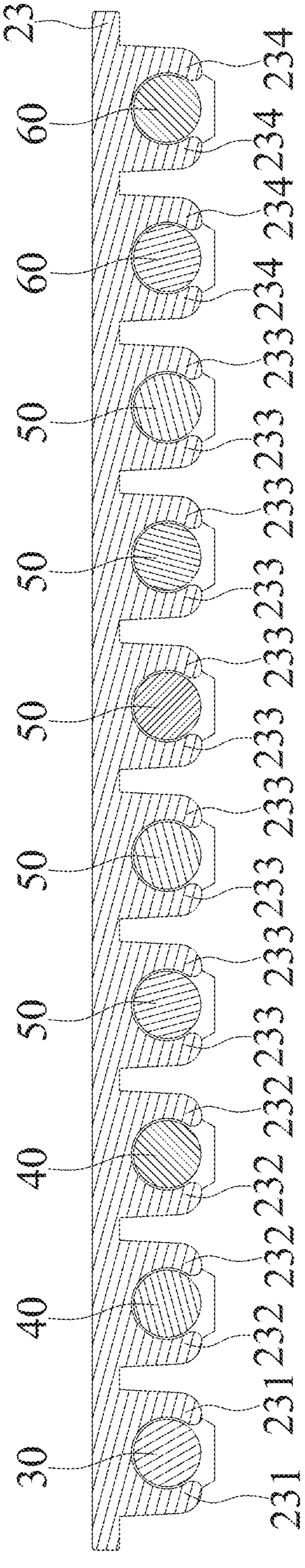
FIG. 5 is a cross sectional view of the tool identification and organization device of FIG. 1.
Figure 6:
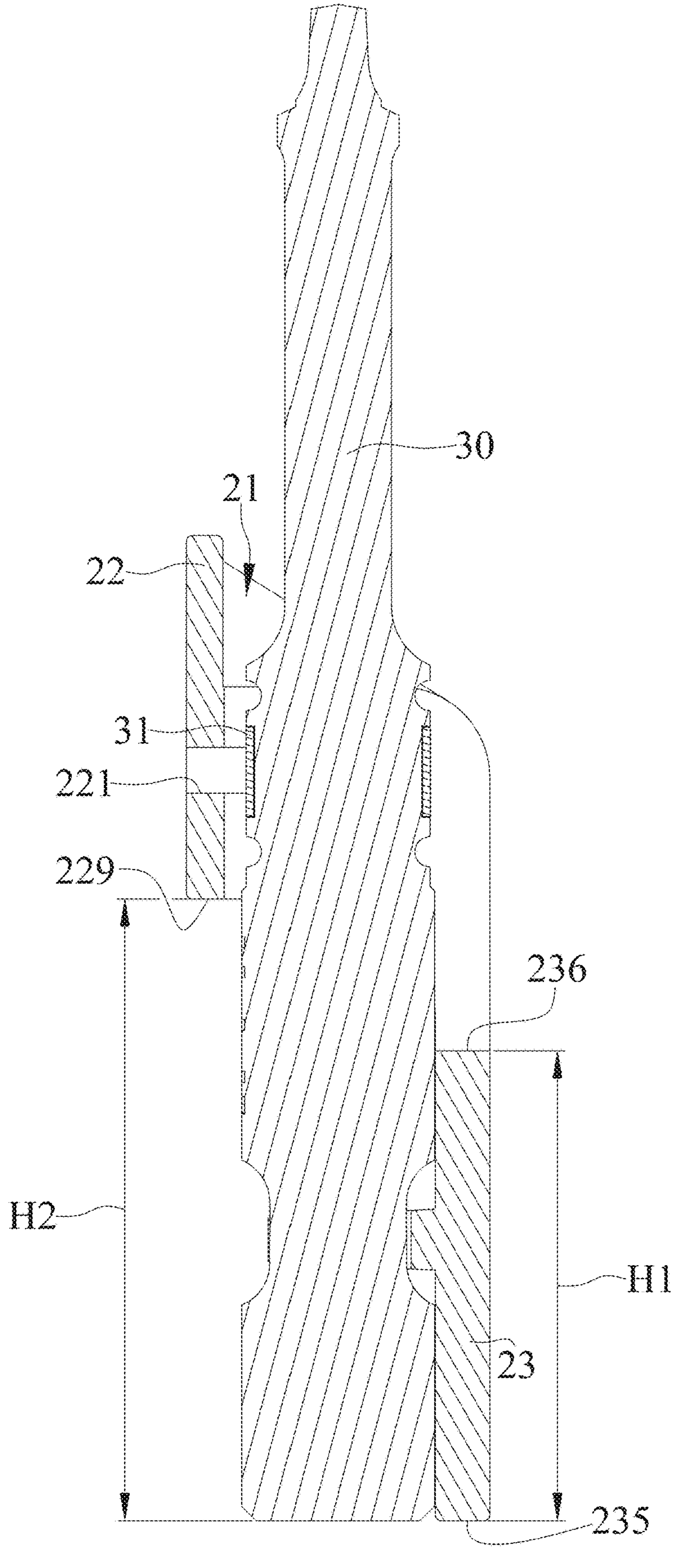
FIG. 6 is another cross sectional view of the tool identification and organization device of FIG. 1.

FIGS. 1-6 show a tool identification and organization device 10 of an embodiment according to the present invention. The tool identification and organization device 10 includes a tool rack 20 and a first tool 30.

The tool rack 20 is provided with a insertion portion 21 and a front panel 22 space from the insertion portion 21, and the front panel 22 is provided with a first identification hole 221 penetrating therethrough.

The first tool 30 is configured to insert into the insertion portion 21 in a height direction. The first tool 30 is provided with a first color marking 31 arranged on an outer periphery thereof and configured to align with the first identification hole 221 to cause the first color marking 31 being visible passing through the front panel 22 via the first identification hole 221.

The front panel 22 is further provided with at least one second identification hole 222 penetrating therethrough. The tool identification and organization device 10 further includes at least one second tool 40 configured to insert into the insertion portion 21 in the height direction to dispose adjacent to the first tool 30. The at least one second tool 40 is provided with a second color marking 41 arranged on an outer periphery thereof and configured to align with the at least one second identification hole 222 to cause the second color marking 41 being visible passing through the front panel 22 via the at least one second identification hole 222. Further, the second color marking 41 has a color different than that of the first color marking 31.

The front panel 22 is further provided with at least one third identification hole 223 and at least one fourth identification hole 224 respectively penetrating therethrough. The tool identification and organization device 10 further includes at least one third tool 50 and at least one fourth tool 60. The at least one third tool 50 is configured to insert into the insertion portion 21 in the height direction to dispose adjacent to the at least one second tool 40. The at least one third tool 50 is provided with a third color marking 51 arranged on an outer periphery thereof and configured to align with the at least one third identification hole 223 to cause the third color marking 51 being visible passing through the front panel 22 via the at least one third identification hole 223. Further, the third color marking 51 has a color different than that of the first color marking 31 and the second color marking 41. The at least one fourth tool 60 is configured to insert into the insertion portion 21 in the height direction to dispose adjacent to the at least one third tool 50. The at least one fourth tool 60 is provided with a fourth color marking 61 arranged on an outer periphery thereof and configured to align with the at least one fourth identification hole 224 to cause the fourth color marking 61 being visible passing through the front panel 22 via the at least one fourth identification hole 224. Further, the fourth color marking 61 has a color different than that of the first color marking 31, the second color marking 41 and the third color marking 51.

The front panel 22 has an outer surface disposed opposite to the insertion portion 21 and provided with a first outer marking 225 located adjacent to the first identification hole 221, at least one second outer marking 226 located adjacent to the at least one second identification hole 222, at least one third outer marking 227 located adjacent to the at least one third identification hole 223, and at least one fourth outer marking 228 located adjacent to the at least one fourth identification hole 224. The first outer marking 225, the at least one second outer marking 226, the at least one third outer marking 227 and the at least one fourth outer marking 228 respectively have different characters.

The first tool 30 is further provided with a first character marking 32 arranged on an outer periphery thereof and having a same character as the first outer marking 225. The at least one second tool 40 is further provided with a second character marking 42 arranged on an outer periphery thereof and having a same character as the second outer marking 226. The at least one third tool 50 is further provided with a third character marking 52 arranged on an outer periphery thereof and having a same character as the third outer marking 227. The at least one fourth tool 60 is further provided with a fourth character marking 62 arranged on an outer periphery thereof and having a same character as the fourth outer marking 228.

The first color marking 31 surrounds the first tool 30 in a circumference direction of the first tool 30. The first character marking 32 is formed on a side surface of the outer periphery of the first tool 30. The second color marking 41 surrounds the second tool 40 in a circumference direction of the second tool 40. The second character marking 42 is formed on a side surface of the outer periphery of the second tool 40. The third color marking 51 surrounds the third tool 50 in a circumference direction of the third tool 50. The third character marking 52 is formed on a side surface of the outer periphery of the third tool 50. The fourth color marking 61 surrounds the fourth tool 60 in a circumference direction of the fourth tool 60. The fourth character marking 62 is formed on a side surface of the outer periphery of the fourth tool 60.

In the embodiment, the number of the at least one second tool 40, the number of the at least one second identification hole 222 and the number of the at least one second outer marking 226 are plural and have the same number. The number of the at least one third tool 50, the number of the at least one third identification hole 223 and the number of the at least one third outer marking 227 are plural and have the same number. The number of the at least one fourth tool 60, the number of the at least one fourth identification hole 224 and the number of the at least one fourth outer marking 228 are plural and have the same number.

The tool rack 20 is further provided with a rear panel 23 spaced from the front panel 22. The insertion portion 21 is arranged between the front panel 22 and the rear panel 23. A side of the rear panel 23 adjacent to the insertion portion 21 is provided with a pair of first clamping arms 231 configured to clamp the first tool 30, a plurality of pair of second clamping arms 232 configured to clamp the plurality of second tools 40, a plurality of pair of third clamping arms 233 configured to clamp the plurality of third tools 50, and a plurality of pair of fourth clamping arms 234 configured to clamp the plurality of fourth tools 60. Thus, the pair of first clamping arms 231, the plurality of pair of second clamping arms 232, the plurality of pair of third clamping arms 233 and the plurality of pair of fourth clamping arms 234 can organize the first tool 30, the plurality of second tools 40, the plurality of third tools 50 and the plurality of fourth tools 60 to the tool rack 20.

The rear panel 23 is provided with a rear lower edge 235 and a rear upper edge 236 opposite to the rear lower edge 235 and defines a first height H1 from the rear lower edge 235 to the rear upper edge 236 in the height direction. The front panel 22 is further provide a front lower edge 229 and defines a second height H2 from the rear lower edge 235 to the front lower edge 229 in the height direction. The second height H2 is less than the first height H1.

Thus, the tools 30, 40 and 50 organized in the tool rack 20 can be indicated the size or type by the visible color markings 31, 41, 51 and 61. Further, the color markings 31, 41, 51 and 61 may be different colors to represent four different size or type tools 30, 40 and 50. Through the color markings 31, 41, 51 and 61, the users only need to look at the appearance of the tool rack 20 to distinguish whether the tools 30, 40 and 50 is stored in the tool rack 20 and the size or type of the tools 30, 40 and 50, and it will not affect the effect of clamping the tools 30, 40 and 50 of the tool rack 20.

Although specific embodiments have been illustrated and described, numerous modifications and variations are still possible without departing from the scope of the invention. The scope of the invention is limited by the accompanying claims.

The invention claimed is:

1. An tool identification and organization device comprising:

a tool rack provided with a insertion portion and a front panel space from the insertion portion, wherein the front panel is provided with a first identification hole penetrating therethrough;

a first tool configured to insert into the insertion portion in a height direction, wherein the first tool is provided with a first color marking arranged on an outer periphery thereof and configured to align with the first identification hole to cause the first color marking being visible passing through the front panel via the first identification hole;

at least one second tool configured to insert into the insertion portion in the height direction to dispose adjacent to the first tool, wherein the at least one second tool is provided with a second color marking arranged on an outer periphery thereof and configured to align with the at least one second identification hole to cause the second color marking being visible passing through the front panel via the at least one second identification hole, and wherein the second color marking has a color different than that of the first color marking;

at least one third tool configured to insert into the insertion portion in the height direction to dispose adjacent to the at least one second tool, wherein the at least one third tool is provided with a third color marking arranged on an outer periphery thereof and configured to align with the at least one third identification hole to cause the third color marking being visible passing through the front panel via the at least one third identification hole, and wherein the third color marking has a color different than that of the first color marking and the second color marking; and at least one fourth tool configured to insert into the insertion portion in the height direction to dispose adjacent to the at least one third tool, wherein the at least one fourth tool is provided with a fourth color marking arranged on an outer periphery thereof and configured to align with the at least one fourth identification hole to cause the fourth color marking being visible passing through the front panel via the at least one fourth identification hole, and wherein the fourth color marking has a color different than that of the first color marking, the second color marking and the third color marking;

wherein the front panel has an outer surface disposed opposite to the insertion portion and provided with a first outer marking located adjacent to the first identification hole, at least one second outer marking located adjacent to the at least one second identification hole, at least one third outer marking located adjacent to the at least one third identification hole, and at least one fourth outer marking located adjacent to the at least one fourth identification hole, and wherein the first outer marking, the at least one second outer marking, the at least one third outer marking and the at least one fourth outer marking respectively have different characters;

wherein the first tool is further provided with a first character marking arranged on an outer periphery thereof and having a same character as the first outer marking, wherein the at least one second tool is further provided with a second character marking arranged on an outer periphery thereof and having a same character as the second outer marking, wherein the at least one third tool is further provided with a third character marking arranged on an outer periphery thereof and having a same character as the third outer marking, and wherein the at least one fourth tool is further provided with a fourth character marking arranged on an outer periphery thereof and having a same character as the fourth outer marking;

wherein the first color marking surrounds the first tool in a circumference direction of the first tool, wherein the first character marking is formed on a side surface of the outer periphery of the first tool, wherein the second color marking surrounds the second tool in a circumference direction of the second tool, wherein the second character marking is formed on a side surface of the outer periphery of the second tool, wherein the third color marking surrounds the third tool in a circumference direction of the third tool, wherein the third character marking is formed on a side surface of the outer periphery of the third tool, and wherein the fourth color marking surrounds the fourth tool in a circumference direction of the fourth tool, and wherein the fourth character marking is formed on a side surface of the outer periphery of the fourth tool;

wherein the number of the at least one second tool, the number of the at least one second identification hole and the number of the at least one second outer marking are plural and have the same number, wherein the number of the at least one third tool, the number of the at least one third identification hole and the number of the at least one third outer marking are plural and have the same number, and wherein the number of the at least one fourth tool, the number of the at least one fourth identification hole and the number of the at least one fourth outer marking are plural and have the same number;

wherein the tool rack is further provided with a rear panel spaced from the front panel, wherein the insertion portion is arranged between the front panel and the rear panel, wherein a side of the rear panel adjacent to the insertion portion is provided with a pair of first clamping arms configured to clamp the first tool, a plurality of pair of second clamping arms configured to clamp the plurality of second tools, a plurality of pair of third clamping arms configured to clamp the plurality of third tools, and a plurality of pair of fourth clamping arms configured to clamp the plurality of fourth tools.

2. The tool identification and organization device as claimed in claim 1, wherein the rear panel is provided with a rear lower edge and a rear upper edge opposite to the rear lower edge and defines a first height from the rear lower edge to the rear upper edge in the height direction, wherein the front panel is further provide a front lower edge and defines a second height from the rear lower edge to the front lower edge in the height direction, and wherein the second height is less than the first height.

* * * * *